(12) United States Patent
McQuade et al.

(10) Patent No.: US 7,769,499 B2
(45) Date of Patent: Aug. 3, 2010

(54) GENERATING A NUMERICAL RANKING OF DRIVER PERFORMANCE BASED ON A PLURALITY OF METRICS

(75) Inventors: Charles Michael McQuade, Issaquah, WA (US); Brett Brinton, Bellevue, WA (US)

(73) Assignee: Zonar Systems Inc., Seattle, WA (US)

( * ) Notice: Subject to any disclaimer, the term of this patent is extended or adjusted under 35 U.S.C. 154(b) by 572 days.

(21) Appl. No.: 11/675,790

(22) Filed: Feb. 16, 2007

(65) Prior Publication Data

US 2007/0239322 A1 Oct. 11, 2007

Related U.S. Application Data

(60) Provisional application No. 60/789,547, filed on Apr. 5, 2006.

(51) Int. Cl.
*G06F 17/00* (2006.01)
*G06F 17/40* (2006.01)
*G06F 19/00* (2006.01)
*G01C 21/00* (2006.01)

(52) U.S. Cl. .............. 701/1; 701/29; 701/35; 701/101; 701/102; 701/201; 701/207; 701/210; 701/213; 705/7; 705/11

(58) Field of Classification Search .............. 340/425.5; 701/35, 29, 52, 207; 702/182; 705/1, 4, 705/400, 7, 11, 32; 707/10, 104.1
See application file for complete search history.

(56) References Cited

U.S. PATENT DOCUMENTS 3,990,067 A 11/1976 Van Dusen et al. .......... 340/306

(Continued)

FOREIGN PATENT DOCUMENTS

CA 2 138 378 11/1994

(Continued)

OTHER PUBLICATIONS

"D.O.T. Driver Vehicle Inspection Reports on your wireless phone!" *FleeTTrakkeR $_{LLC}$ 2002-2003 FleeTTrakkeR$_{LLC}$. All rights reserved* <http://www._ fleettrakker.com/web/index.jsp>.

(Continued)

*Primary Examiner*—Khoi Tran
*Assistant Examiner*—Dale Moyer
(74) *Attorney, Agent, or Firm*—Ronald M. Anderson (57) ABSTRACT

Sensors on a vehicle are used to sense different data corresponding to a plurality of metrics, which are related to a performance of driver while operating the vehicle. Values are determined for the metrics that are thus collected. These values are added together and the resulting total is normalized to produce a driver performance value or performance ranking. The metrics that are collected can include, for example, idle time data, acceleration and deceleration data, times that a speed limit is exceeded, and other metrics of interest to an owner of the vehicle for evaluating driver performance. A weighting factor can be applied to any metric considered of greater importance. The driver performance value can be displayed in real-time to the driver to provide an immediate feedback of performance, or the collected metrics can be transmitted to a remote location for determination of driver performance rankings at a later time.

18 Claims, 4 Drawing Sheets

U.S. PATENT DOCUMENTS

| | | | | |
|---|---|---|---|---|
| 4,025,791 A | | 5/1977 | Lennington et al. | 250/341.1 |
| 4,258,421 A | | 3/1981 | Juhasz et al. | 701/35 |
| 4,325,057 A | | 4/1982 | Bishop | 340/994 |
| 4,602,127 A | | 7/1986 | Neely et al. | 379/68 |
| 4,763,356 A | | 8/1988 | Day, Jr. et al. | 379/368 |
| 4,799,162 A | | 1/1989 | Shinakawa et al. | 701/117 |
| 4,804,937 A | | 2/1989 | Barbiaux et al. | 340/459 |
| 4,897,792 A | | 1/1990 | Hosoi | 364/449 |
| 5,058,044 A | | 10/1991 | Stewart et al. | 702/184 |
| 5,068,656 A | | 11/1991 | Sutherland | 340/989 |
| 5,128,651 A | | 7/1992 | Heckart | 340/433 |
| 5,206,643 A | | 4/1993 | Eckelt | 340/932.2 |
| 5,223,844 A | | 6/1993 | Mansell et al. | 342/357.07 |
| 5,243,323 A | | 9/1993 | Rogers | 340/433 |
| 5,321,629 A | | 6/1994 | Shirata et al. | 702/187 |
| 5,394,136 A | * | 2/1995 | Lammers et al. | 701/35 |
| 5,399,844 A | | 3/1995 | Holland | 235/376 |
| 5,459,304 A | | 10/1995 | Eisenmann | 235/380 |
| 5,459,660 A | | 10/1995 | Berra | 701/33 |
| 5,499,182 A | * | 3/1996 | Ousborne | 701/35 |
| 5,541,845 A | | 7/1996 | Klein | 364/449 |
| 5,546,305 A | * | 8/1996 | Kondo | 701/29 |
| 5,557,254 A | | 9/1996 | Johnson et al. | 340/426.19 |
| 5,557,268 A | | 9/1996 | Hughes et al. | 340/933 |
| 5,572,192 A | | 11/1996 | Berube | 340/574 |
| 5,585,552 A | | 12/1996 | Heuston et al. | 73/116 |
| 5,600,323 A | | 2/1997 | Boschini | 341/173 |
| 5,610,596 A | | 3/1997 | Petitclerc | 340/825.23 |
| 5,629,678 A | | 5/1997 | Gargano et al. | 340/573.4 |
| 5,671,158 A | | 9/1997 | Fournier et al. | 345/8 |
| 5,680,328 A | | 10/1997 | Skorupski et al. | 701/35 |
| 5,719,771 A | | 2/1998 | Buck et al. | 455/456.5 |
| 5,731,893 A | | 3/1998 | Dominique | 359/379 |
| 5,758,299 A | * | 5/1998 | Sandborg et al. | 701/29 |
| 5,808,565 A | | 9/1998 | Matta et al. | 340/994 |
| 5,839,112 A | | 11/1998 | Schreitmueller et al. | 705/4 |
| 5,874,891 A | | 2/1999 | Lowe | 340/433 |
| 5,942,753 A | | 8/1999 | Dell | 250/338.1 |
| 5,995,898 A | | 11/1999 | Tuttle | 701/102 |
| 6,043,661 A | | 3/2000 | Gutierrez | 324/504 |
| 6,054,950 A | | 4/2000 | Fontana | 342/463 |
| 6,078,255 A | | 6/2000 | Dividock et al. | 340/539 |
| 6,092,021 A | * | 7/2000 | Ehlbeck et al. | 701/123 |
| 6,107,915 A | | 8/2000 | Reavell et al. | 340/433 |
| 6,107,917 A | | 8/2000 | Carrender et al. | 340/505 |
| 6,128,959 A | | 10/2000 | McGovern et al. | 73/660 |
| 6,169,943 B1 | | 1/2001 | Simon et al. | 701/29 |
| 6,236,911 B1 | | 5/2001 | Kruger | 701/1 |
| 6,253,129 B1 | | 6/2001 | Jenkins | 701/29 |
| 6,256,579 B1 | | 7/2001 | Tanimoto | 701/201 |
| 6,263,273 B1 | * | 7/2001 | Henneken et al. | 701/51 |
| 6,263,276 B1 | | 7/2001 | Yokoyama et al. | 701/207 |
| 6,370,454 B1 | | 4/2002 | Moore | 701/29 |
| 6,374,176 B1 | | 4/2002 | Schmier et al. | 701/200 |
| 6,396,413 B2 | | 5/2002 | Hines et al. | 340/825.49 |
| 6,411,891 B1 | | 6/2002 | Jones | 701/201 |
| 6,438,472 B1 | | 8/2002 | Tano et al. | 701/35 |
| 6,450,411 B1 | | 9/2002 | Rash et al. | 236/44 A |
| 6,456,039 B1 | | 9/2002 | Lauper et al. | 320/107 |
| 6,505,106 B1 | | 1/2003 | Lawrence | 701/35 |
| 6,529,808 B1 | | 3/2003 | Diem | 701/29 |
| 6,539,296 B2 | | 3/2003 | Diaz et al. | 701/33 |
| 6,594,621 B1 | | 7/2003 | Meeker | 702/185 |
| 6,597,973 B1 | | 7/2003 | Barich et al. | 701/29 |
| 6,609,082 B2 | | 8/2003 | Wagner | 702/182 |
| 6,614,392 B2 | | 9/2003 | Howard | 342/357.07 |
| 6,664,897 B2 | | 12/2003 | Pape et al. | 340/573.3 |
| 6,671,646 B2 | | 12/2003 | Manegold et al. | 702/127 |
| 6,708,113 B1 | | 3/2004 | Von Gerlach et al. | 701/210 |
| 6,804,626 B2 | | 10/2004 | Manegold et al. | 702/182 |
| 6,834,259 B1 | | 12/2004 | Nicholson et al. | 702/187 |
| 6,894,617 B2 | | 5/2005 | Richman | 340/573.1 |
| 6,909,947 B2 | * | 6/2005 | Douros et al. | 701/29 |
| 7,027,955 B2 | | 4/2006 | Markwitz et al. | 702/187 |
| 7,048,185 B2 | | 5/2006 | Hart | 235/384 |
| 7,103,460 B1 | | 9/2006 | Breed | 701/29 |
| 7,174,243 B1 | | 2/2007 | Lightner et al. | 701/33 |
| 7,174,277 B2 | | 2/2007 | Vock et al. | 702/188 |
| 7,254,516 B2 | | 8/2007 | Case, Jr. et al. | 702/182 |
| 2001/0047123 A1 | | 11/2001 | Melick et al. | 705/8 |
| 2001/0053983 A1 | | 12/2001 | Reichwein et al. | 705/1 |
| 2002/0016655 A1 | | 2/2002 | Joao | 701/35 |
| 2002/0022979 A1 | | 2/2002 | Whipp et al. | 705/5 |
| 2002/0022984 A1 | | 2/2002 | Daniel et al. | 705/8 |
| 2002/0065698 A1 | | 5/2002 | Schick et al. | 705/8 |
| 2002/0107833 A1 | | 8/2002 | Kerkinni | 707/1 |
| 2002/0107873 A1 | | 8/2002 | Winkler et al. | 707/104.1 |
| 2002/0111725 A1 | * | 8/2002 | Burge | 701/29 |
| 2002/0122583 A1 | | 9/2002 | Thompson | 382/141 |
| 2002/0133273 A1 | | 9/2002 | Lowrey et al. | 701/29 |
| 2002/0133275 A1 | | 9/2002 | Thibault | 701/35 |
| 2002/0147610 A1 | | 10/2002 | Tabe | 705/1 |
| 2002/0150050 A1 | | 10/2002 | Nathanson | 370/241 |
| 2002/0156558 A1 | | 10/2002 | Hanson et al. | 701/33 |
| 2002/0163449 A1 | | 11/2002 | Flick | 340/988 |
| 2002/0178147 A1 | | 11/2002 | Arroyo et al. | 707/2 |
| 2002/0188593 A1 | | 12/2002 | Moser et al. | 707/1 |
| 2003/0030550 A1 | | 2/2003 | Talbot | 340/433 |
| 2003/0033061 A1 | | 2/2003 | Chen et al. | 701/33 |
| 2003/0109973 A1 | | 6/2003 | Hensey et al. | 701/35 |
| 2003/0120745 A1 | | 6/2003 | Katagishi et al. | 709/217 |
| 2004/0009819 A1 | | 1/2004 | Koga | 464/51 |
| 2004/0236596 A1 | * | 11/2004 | Chowdhary et al. | 705/1 |
| 2005/0273250 A1 | | 12/2005 | Hamilton et al. | 701/200 |
| 2007/0179709 A1 | | 8/2007 | Doyle | 701/209 |
| 2008/0154489 A1 | | 6/2008 | Kaneda et al. | 701/201 |
| 2008/0154712 A1 | * | 6/2008 | Wellman | 705/11 |

FOREIGN PATENT DOCUMENTS

| | | | |
|---|---|---|---|
| CA | 2 326 892 | | 10/1999 |
| CA | 2 388 572 | | 5/2001 |
| EP | 2116968 | A1 * | 11/2009 |
| WO | WO 03/023550 | | 3/2003 |

OTHER PUBLICATIONS

"Detex Announces the Latest Innovation in Guard Tour Verification Technology." *DETEX Life Safety, Security and Security Assurance.* Jan. 1, 2003. 1pp. © 2002-2004 Detex Corporation. <http://www.detex.com/NewsAction.jspa?id=3>.

"Nextel, Motorola and Symbol Technologies Offer First Wireless Bar Code Scanner for Mobile Phones." *InvoiceDealers.*

"The Data Acquisition Unit Escorte." *The Proxi Escort.com.* Nov. 20, 2001. 4pp. © 2000 GCS General Control Systems. <http://www.gcs.at/eng/produkte/hw/escorte.htm>.

"Tracking out of route: software helps fleets compare planned routes to actual miles. (TECHNOLOGY)." *Commercial Carrier Journal.* Published Oct. 1, 2005. 4pp. NDN-219-1054-1717-0.

"What is the Child Check-Mate Safety System?" *2002@Child Checkmate Systems, Inc.* <http://www.childcheckmate.com/what.html>.

Albright, Brian: "Indiana Embarks on Ambitious RFID roll out." *Frontline Solutions.* May 20, 2002; 2pp. Available at: <http://www.frontlinetoday.com/frontline/article/articleDetail.jsp?id=19358>.

Anonymous. "Transit agency builds GIS to plan bus routes." *American City & County.* vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." *ICONTEXT Indiana;s Workforce and Economy*. Jan.-Feb. 2003 vol. 4, No. 5pp. Available at <http://www.incontext.indiana.edu/2003/jan-feb03/governement.html>.

Quaan et al., "Guard Tour Systems." *Security Management ONLINE*. Sep. 16, 2003. 1pg. © 2000 Available at: <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving A Niche Beyond Asset Tracking." *Business Solutions*. Feb. 1999: 5pp. Available at: <http://www.businesssolutionsmag.com/Articles/1999_02/990208.html>.

Tiscor: The Mobile Software Solutions Provider. *Inspection Manager*: An Introduction and Slide Presentation; 19pp. Available: <www/TOSCOR.com>.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Tuttle, John R. "Digital RF/ID Enhances GPS" Proceedings of the Second Annual Wireless Symposium, pp. 406-411, Feb. 15-18, 1994, Santa Clara, CA.

Want, Roy, "RFID A Key to Automating Everything." *Scientific American* (Jan. 2004): 58-65.

"The PenMaster" and "The PSION Workabout." Copyright 2000 GCS General Control System. <http://www.gcs.at/eng/produkte/hw/penmaster.htm>.

Tiscor: *Inspection Manager 6.0 User Guide*. USA; 2004. 1-73.

* cited by examiner

GENERATING A NUMERICAL RANKING OF DRIVER PERFORMANCE BASED ON A PLURALITY OF METRICS

RELATED APPLICATIONS

This application is based on a prior copending provisional application, Ser. No. 60/789,547, filed on Apr. 5, 2006, the benefit of the filing date of which is hereby claimed under 35 U.S.C. §119(e).

BACKGROUND

As the cost of sensors, communications systems and navigational systems has dropped, operators of commercial and fleet vehicles now have the ability to collect a tremendous amount of data about the vehicles that they operate, including how the vehicles are being driven by the drivers operating such vehicles.

Unfortunately, simply collecting such data does not automatically translate into cost savings. It would be desirable to provide such fleet operators with additional tools in order to derive a benefit from the wealth of data that can be collected. Preferably, such tools can be used to provide feedback to drivers to enable the fleet operator to encourage driving habits leading to cost savings. Such a tool might thus be used to develop objective criteria that could be used encourage and provide incentives to drivers to improve their performance in operating the vehicles in a fleet.

SUMMARY

One aspect of the novel concepts presented herein is a method of producing a numerical ranking of a driver's performance based on a plurality of metrics. Such a method comprises the steps of automatically collecting a plurality of metrics while a driver is operating a vehicle, automatically determining a numerical value for each metric, automatically combining the numerical values for the plurality of metrics to achieve a numerical performance value, and normalizing the numerical performance value to achieve a numerical ranking of the driver's performance while operating a vehicle.

Each one of the plurality of metrics will correspond to a different aspect of the driver's performance while operating a vehicle. Those of ordinary skill in the art will readily recognize that a number of different types of sensors are commonly integrated into commercial, passenger, and fleet vehicles. Such sensors can readily collect a wide variety of operational data that are related to driver performance. For example, one such metric is idle time of a vehicle. Excessive idling time generates increased emissions, increased fuel consumption, and increased engine wear. From the point of view of the fleet operator, drivers who operate vehicles so as to incur relatively greater idle times exhibit a lower performance compared to drivers who do so while incurring relatively less idle time. Additional performance metrics related to both vehicle and driver performance include the amount of time the vehicle is accelerating during the operation of the vehicle by the driver, the extent of such acceleration, the amount of time the vehicle is decelerating during the operation of the vehicle by the driver, the extent of deceleration, whether (or how often) a driver deviates from a predefined route, and whether (or how often and to what extent) a driver exceeds a speed limit. Drivers who accelerate and decelerate often and accelerate or brake the vehicle excessively are likely to cause increased fuel consumption, increased emissions, and increased engine and/or brake wear, as compared to drivers who are more able to accelerate and decelerate modestly, and who are more able to maintain a constant speed.

By combining a plurality of vehicle metrics related to driver performance, a single numerical score or numerical ranking can be used to provide feedback to individual drivers. Such a numerical ranking can be used as a management tool to improve driver performance. For example, drivers with relatively poor numerical ranking scores can receive counseling or warnings, which should lead to an improvement in their performance, while drivers receiving relatively better scores can receive praise or bonuses that encourage them and others to maintain or improve good performance in operating a vehicle. Comparing such scores across companies or between individual branches of a company can be used as a contest or as a motivational tool, where drivers with relatively better scores earn prizes or public praise. For example, a fleet operator could regularly post a list of driver performance rankings in company break rooms, so that drivers can compare their individual performance rankings with one another.

Essentially, for each metric collected, a numerical value will be determined for that metric. Different metrics can be weighted differently, according to the preference of the fleet operator. For example, if a fleet operator is particularly concerned about reducing excessive idle time, but is less concerned about drivers' acceleration and deceleration habits, idle time can weighted more significantly, to have a greater effect on the numerical ranking determined for the drivers than acceleration and deceleration metrics. Thus, in that case, increased idle time will have a greater proportional negative effect on a driver's overall score, than will a driver's excessive acceleration and deceleration of a vehicle.

Normalizing the combined numerical scores for each metric is important, as such normalization enables the numerical rankings for different drivers to be compared. In one embodiment, the normalization is based on dividing the combined rankings by the distance over which the driver has operated the vehicle. For example, the drivers' combined numerical values for each metric can be divided by the number of miles over which the driver has operated vehicle. In another embodiment, the normalization is based on dividing the combined rankings by the length of time the driver has operated a vehicle. For example, a driver's combined numerical values for each metric can be divided by the number of hours the driver has operated a vehicle.

Those of ordinary skill in the art will readily recognize that a variety of different valuation paradigms can be implemented for determining a numerical value for each metric. Under some paradigms, a relatively higher normalized combined total will represent relatively better driver performance, while under other paradigms a relatively lower normalized combined total will represent relatively better driver performance. The specific valuation paradigm employed is less important than the aspect of the present invention directed to providing a numerical value that can be used to evaluate driver performance, where the numerical value is based on measurable metrics corresponding to a driver's performance while operating a vehicle. It should also be recognized that the concepts presented herein can be applied to other types of equipment, such as heavy machinery and heavy construction equipment (backhoes, excavators, bulldozers, etc.), as well as to other types of equipment or machinery that an operator controls, so long as the various aspects of the operator's performance can be sensed and the results used to determine a numerical value representative of the overall quality with which the operator controls the equipment or machinery. It should also be recognized that the concepts provided herein can also be beneficially implemented in other types of vehicles, including automobiles (such as rental car fleets, government vehicles, and fleet vehicles assigned to sales representatives or other employees of a business).

As noted above, one of the metrics that can be beneficially employed relates to determining whether a driver has deviated from a predefined route. This metric can be automatically determined by providing predefined route data comprising geographical coordinates, automatically collecting geographical coordinate data while the driver is operating the vehicle (for example using a global positioning satellite (GPS) receiver), and determining if the driver has deviated from the predefined route by comparing the collected geographical coordinate data with the predefined route data.

Yet another metric that can be beneficially employed relates to determining whether a driver has exceed a speed limit, which can be automatically determined in several different fashions. In one embodiment, it can be determined whether a driver has violated the speed limit by providing a baseline speed limit value (such as 60 miles an hour, for vehicles primarily operated on freeways), automatically collecting vehicle speed data while the driver is operating the vehicle on freeways, and determining if the driver has deviated from the baseline speed limit value by comparing the collected vehicle speed data with the baseline speed limit value (or distance traveled per unit time). In a different embodiment, the step of determining if the driver has violated the speed limit comprises the steps of providing predefined route data comprising geographical coordinates and speed limits associated with each geographical coordinate, automatically collecting geographical coordinate data and vehicle speed data while the driver is operating the vehicle, and determining if the driver has violated the speed limit by comparing the collected geographical coordinate data and vehicle speed data with the predefined route data for which the speed limit is specified at different portions of the route.

It should be recognized that the steps of collecting the plurality of metrics and processing the plurality of metrics to determine the numerical ranking of the driver's performance can be implemented in physically different locations. In one embodiment, the plurality of metrics are automatically collected by the vehicle, and then transmitted to a remote computing device for processing. The metrics can be transmitted to the remote computing device in real-time, or can be saved in a memory in the vehicle and later transmitted to the remote computing device for processing, for example, when the vehicle is returned to a central garaging facility. In other embodiments, processing of the plurality of the metrics occurs within the vehicle. Where the processing of the plurality of metrics occurs within the vehicle, the driver's current performance ranking can be displayed in real-time to the driver to provide immediate feedback to help the driver improve performance while operating a vehicle. This approach would be analogous to providing real-time fuel mileage estimates to a driver based on current vehicle operating conditions. Providing drivers with feedback in real-time will enable drivers to correct driving habits while operating the vehicle, leading to an improved performance ranking. In such an embodiment, it would be desirable to enable the driver to review the metrics responsible for decreasing a driver's performance ranking. For example, if the driver's current performance ranking is relatively low because the driver is frequently accelerating and decelerating, rather than maintaining a constant speed, the display provided to the driver can be customized to indicate the specific metrics responsible for the lower than desired performance ranking.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Exemplary Logic for Determining Driver Performance

Figure 1:
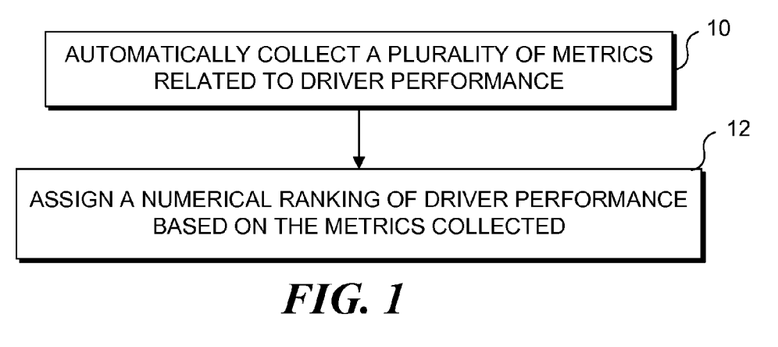
FIG. 1 is a high level flow chart showing the overall method steps implemented in accord with one exemplary embodiment for achieving the concepts disclosed herein.

FIG. 1 is a high level flow chart showing the overall method steps implemented in accord with one aspect of the concepts disclosed herein. In a block 10 a plurality of metrics related to driver performance are automatically collected by a plurality of sensors incorporated into a vehicle. Such metrics generally relate to driver operation of the vehicle, but may also simply include data related to the vehicle. Such metrics can include, but are not limited to, vehicle speed, vehicle acceleration, vehicle deceleration, engine RPMs, idle time, engine temperature, coolant temperature, oil temperature, fuel consumption, and vehicle positional data. Those of ordinary skill in the art will readily recognize that many different metrics related to vehicle performance and driver performance can be collected. Thus, it should be recognized that the specifically identified metrics are intended to be exemplary, rather than limiting. In a block 12, a numerical ranking of the driver's performance is determined based on at least some of the metrics collected.

Figure 2:
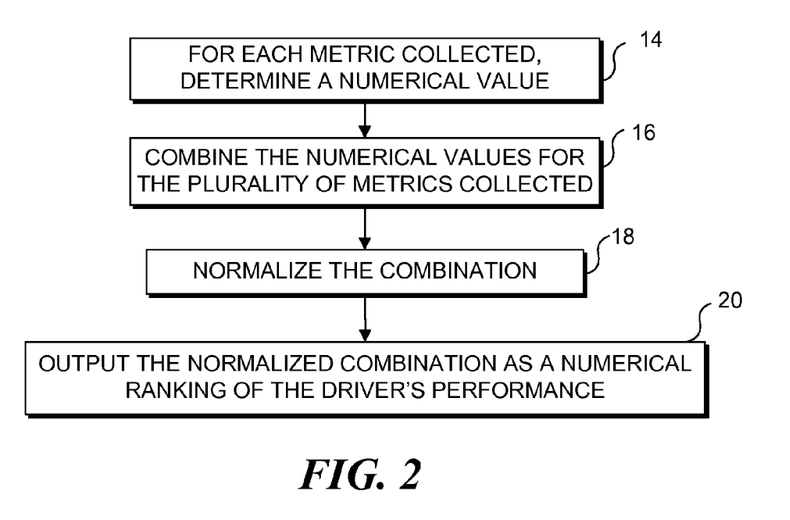
FIG. 2 is a more detailed flow chart showing method steps implemented in an exemplary preferred embodiment.

FIG. 2 is a more detailed flow chart showing method steps implemented in a preferred embodiment, providing additional details as to how the numerical ranking of the driver's performance can be determined. In a block 14, a numerical value is assigned to each metric collected. It should be recognized that plurality of valuation schemes can be implemented, and the specific scheme implemented is not critical. It should also be recognized that a fleet operator can perceive some metrics to be more or less important to overall driver performance. Thus, individual metrics can be weighted differently. For example, one fleet operator may have little tolerance for drivers who exceed posted speed limits and want to place great emphasis on this metric when determining the numerical ranking. Such a fleet operator can assign significantly more weight to the detection of a driver exceeding a speed limit than to the detection of a driver incurring excessive idle time. Regardless of the specific valuation scheme implemented, a numerical ranking will be determined for each metric collected. In a block 16, the numerical rankings for each metric are combined. In a block 18, the combined numerical values for each metric are normalized, to enable performance rankings for different drivers to be more equitably compared. In one embodiment, the normalization is based on a distance over which a driver has operated a vehicle. In another embodiment, the normalization is based on an amount of time the driver has operated a vehicle. This normalization enables the output of the normalized combined total to be provided as a numerical ranking in a block 20 indicating a driver's performance. Note that the valuation scheme implemented will determine whether a specific numerical value is indicative of a relatively good performance or a relatively poor performance. Under some valuation schemes, relatively higher combined and normalized numerical rankings are generally indicative of relatively better driver performance. In other valuation schemes, relatively lower combined and normalized numerical rankings are generally indicative of relatively better driver performance.

Figure 3:
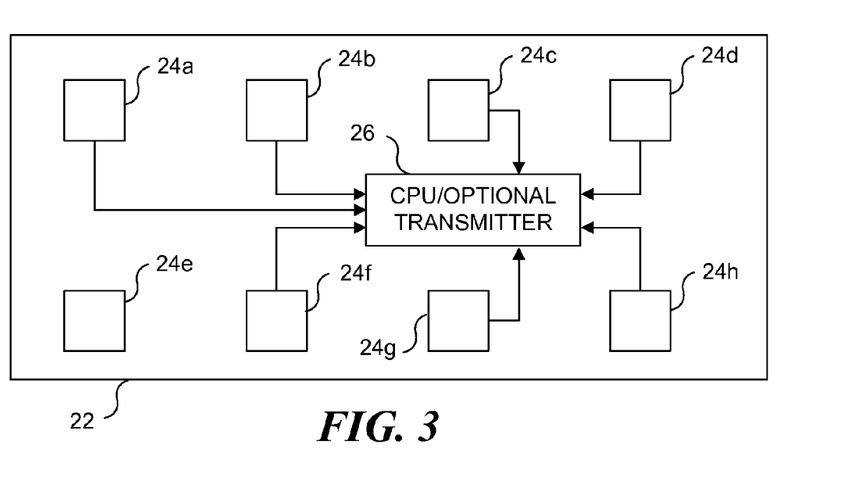
FIG. 3 schematically illustrates a vehicle that includes a plurality of sensors configured to collect the required metrics.

FIG. 3 schematically illustrates a vehicle including a plurality of sensors configured to collect the required metrics. A vehicle 22, such as a bus or a truck, includes a plurality of sensors 24a-24h. It should be recognized that the specific number of sensors, and the specific types of sensors and types of data collected by the sensors, are not critical, so long as the sensors collect data for the desired metrics. As noted above, a plurality of different metrics have been specifically identified, however it should be recognized that such metrics are intended to be exemplary, and not limiting on the concepts disclosed herein. In the disclosed exemplary embodiment, each sensor is coupled to a CPU 26 (which, as described in greater detail below, may in some of embodiments be replaced with (or provided in addition to) a transmitter).

Figure 4A:
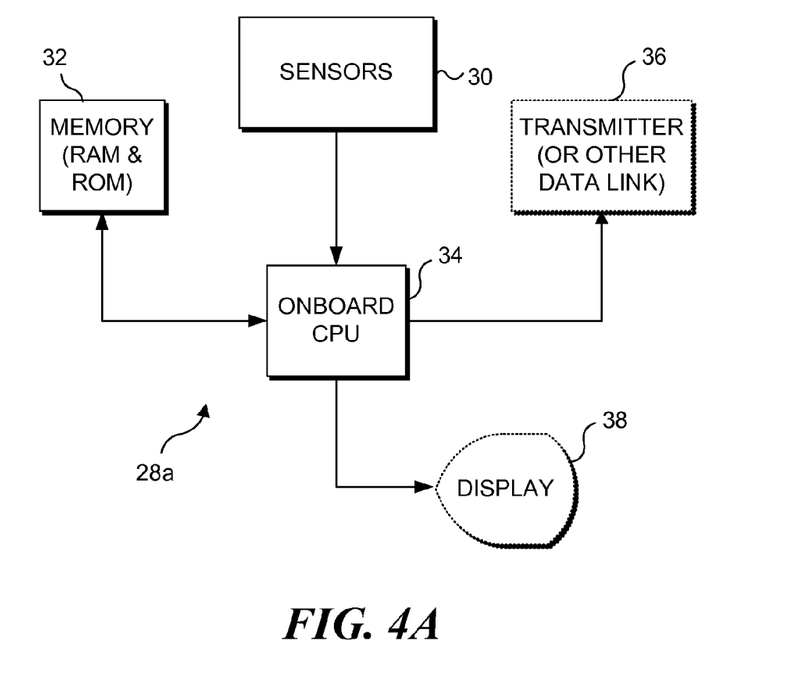
FIG. 4A is a functional block diagram illustrating the functional elements of an embodiment in which the metrics are processed within the vehicle to obtain the driver's performance ranking, for example, in real-time.

FIG. 4A is a functional block diagram 28a illustrating the functional elements of an exemplary embodiment in which the metrics are processed within the vehicle to obtain the driver's performance ranking. The vehicle is equipped with sensors 30 configured to collect the required metrics. The sensors are logically coupled with an onboard vehicle CPU 34, which is configured to implement the method steps generally described above. CPU 34 is logically coupled to a memory 32 in which are stored the machine instructions that are executed by the CPU to carry out these logical steps. The plurality of metrics collected by sensors 30 can also be stored in memory 32. A (preferably optical or wireless) transmitter 36 (or other data link) can be included to enable either the plurality of metrics or the driver's performance ranking to be communicated to a remote computing device. An optional display 38 can be included in the vehicle to provide real-time feedback to the driver (by displaying the driver's performance ranking in real-time). As discussed above, if display 38 is implemented, it is desirable to provide the ability for the driver to determine which metrics are having the most impact on the driver's performance ranking.

Figure 4B:
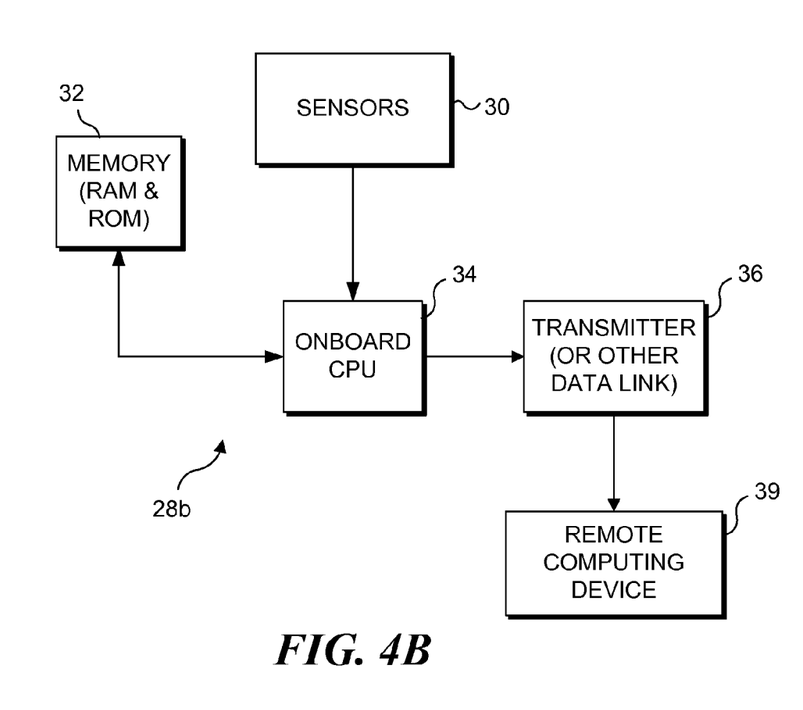
FIG. 4B is a functional block diagram illustrating the functional elements of an embodiment in which the metrics are processed by a computing device remote from the vehicle to obtain the driver's performance ranking.

FIG. 4B is a functional block diagram 28b illustrating the functional elements of an exemplary embodiment in which the metrics are processed by a computing device to obtain the driver's performance ranking, where the computing device is remote from the vehicle. Once again, the vehicle is equipped with sensors 30 configured to collect the required metrics. The sensors are logically coupled with an onboard vehicle CPU 34, which is configured to transmit the collected metrics to remote computing device 39 through transmitter 36 (or other data link). In a particularly preferred embodiment, transmitter 36 is a wireless transmitter. In such an embodiment, the method steps generally described above for processing the collected metrics can be executed by the remote computing device. CPU 34 is logically coupled to memory 32 in which the collected metrics can be stored, if the metrics are not to be transmitted to the remote computing device in real-time. Even if the metrics are transmitted to the remote computing device in real-time, such metrics can be stored in memory 32 as a backup in case the transmission is not successful. In such an embodiment, a display is not likely to be beneficial, unless the remote computing device is configured to transmit the calculated performance ranking back to the vehicle for display to the driver.

Figure 5:
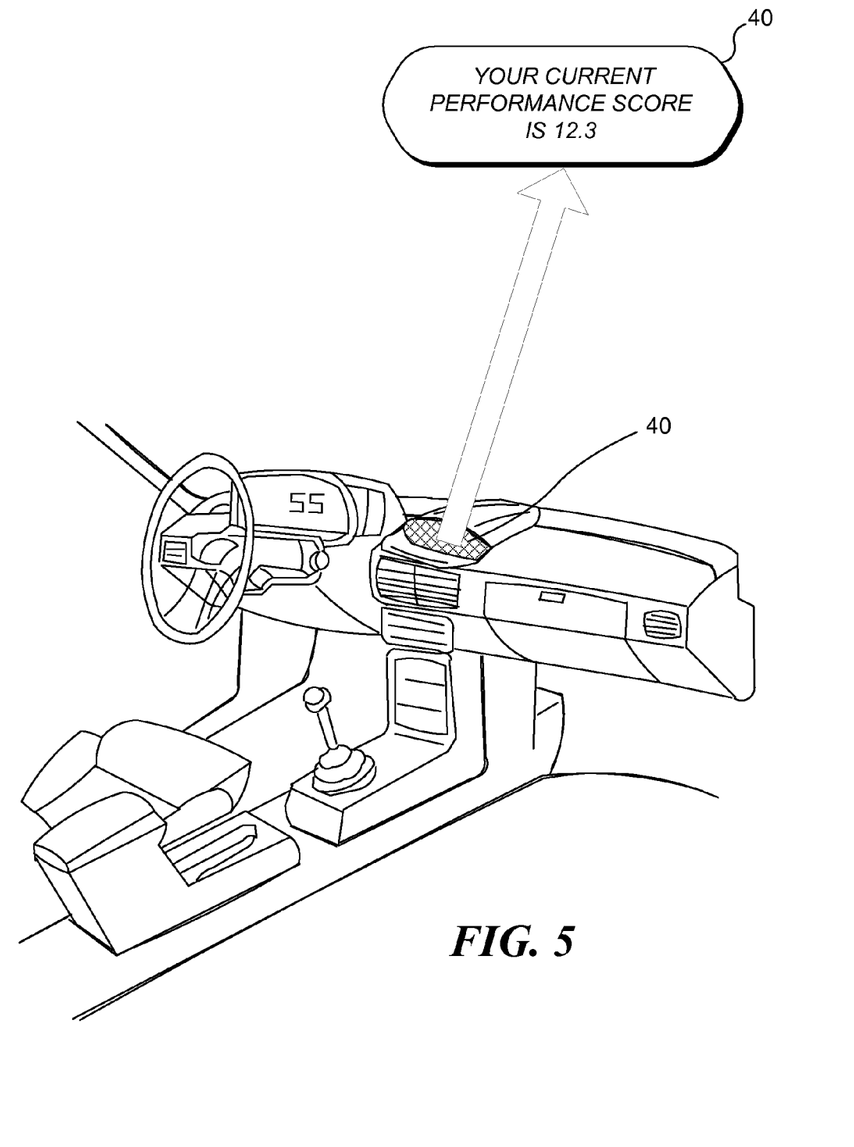
FIG. 5 schematically illustrates the interior of a vehicle configured with a display to provide the driver with the performance ranking in real-time.

FIG. 5 schematically illustrates the interior of a vehicle configured with a display 40 to provide the driver with a performance ranking in real-time. As discussed above, such a display can be implemented by the embodiment schematically illustrated in FIG. 4A.

Figure 6:
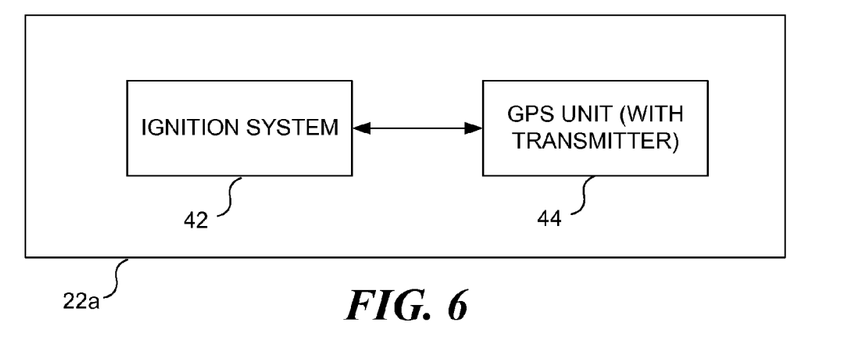
FIG. 6 schematically illustrates a vehicle that includes a GPS unit configured to collect GPS data that can be used to provide a plurality of metrics for use in determining a driver performance ranking in accord with one aspect of the concepts disclosed herein.

FIG. 6 schematically illustrates a vehicle 22a that includes a GPS unit 44 configured to collect GPS data that can be used to determine a plurality of metrics for use in determining a driver performance ranking. Such an embodiment enables the driver performance ranking discussed above to be generated without requiring individual or additional sensors to be integrated into the vehicle (although it should be recognized that such individual sensors could be used in addition to (or as an alternative source of) the data provided by the GPS unit, to provide additional metrics used in determining a driver's performance ranking, generally consistent with the method steps described above with respect to FIGS. 1 and 2). Vehicle 22a, such as a bus or a truck (or automobile, or construction equipment, generally as described above) includes GPS unit 44 coupled with an ignition system 42 of the vehicle. In an exemplary embodiment, the GPS unit will be coupled with the ignition switch, such that when the ignition switch is in the "on position", i.e., it is assumed that when the ignition switch is on, the engine of the vehicle is actually running, the GPS unit will be activated. As described in greater detail below, GPS data can be used for a plurality of metrics, including idle time, deceleration time and magnitude, acceleration time and magnitude, and to determine if a driver has violated a speed limit. The most basic GPS unit is able to determine a position of the vehicle at a current time. That positional information can be used to calculate the speed of a vehicle by determining the change in position of the vehicle between two successive points in time, and to calculate the acceleration or deceleration of the vehicle by determining the change in speed of the vehicle over a time increment. More typically, GPS units automatically determine position, speed, and acceleration/ deceleration internally, and these metrics would then not need to be determined by an external computing device (remote or local).

GPS unit 44 preferably includes or is connected to a wireless transmitter (not separately shown), such that the GPS data can be wirelessly transmitted to a remote computing device, preferably in real-time. The remote computing device can be programmed to manipulate the GPS data to determine a plurality of metrics, which can then be used to calculate a driver's performance ranking, generally as described above. It should be recognized that as an alternative, GPS unit 44 can include an onboard memory, such that the GPS data are stored in the GPS unit, to be uploaded to a remote computing device at a later time (for example, using a wireless or hardwired data link). Significantly, GPS unit 44 enables driver performance rankings to be determined, even if the vehicle is not equipped with separate other sensors of the metric data or an onboard computer (as are required in the embodiments of FIGS. 3, 4A, and 4B).

Figure 7:
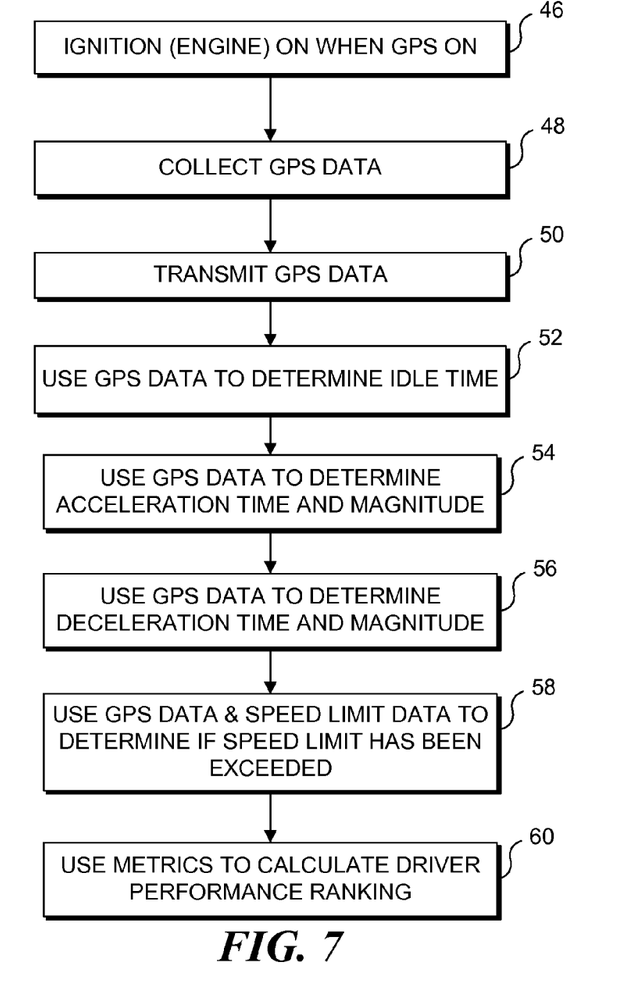
FIG. 7 is a flow chart showing method steps implemented in an exemplary preferred embodiment, where GPS data are used to provide a plurality of metrics used to determine the driver's performance ranking.

FIG. 7 is a flow chart showing method steps implemented when GPS data are used to calculate a plurality of metrics used to determine the driver's performance ranking. In a block 46, the vehicle ignition is switched on (and it is assumed that the engine is running), thereby powering on the GPS unit. In a block 48, the GPS unit collects GPS data (information corresponding both to a particular point in time and a specific geographical position that the vehicle occupies at that specific point in time). In a block 50, the GPS data are transmitted to a remote computing device. As noted above, the GPS data are preferably transmitted to the remote computing device in real-time. However, it should be recognized that the GPS data can be temporarily stored within the GPS unit (or in a memory electronically coupled to the GPS unit), and transferred to the remote computing device at a later time. In a block 52, the remote computing device uses the GPS data to calculate an idle time metric. Because the GPS unit is only on when the ignition switch is on and the engine of the vehicle is assumed to be running, an assumption can be made that the idle time equals the accumulated time that the GPS unit is on, but the vehicle is not changing position.

In a block 54, the remote computing device uses the GPS data to determine metrics corresponding to acceleration time and acceleration magnitude. In a block 56, the remote computing device uses the GPS data to determine metrics corresponding to deceleration time and deceleration magnitude. In a block 58, the remote computing device uses the GPS data to determine whether a driver has exceeded a speed limit. Those of ordinary skill in the art will readily recognized that several mapping databases exist that include a database of speed limits and which enable a speed limit for a specific portion of a route being driven by a vehicle to be determined based on a particular geographical coordinate of the vehicle following that route. GPS data includes an indication of the speed of the vehicle at a particular time while the vehicle is at a particular geographical location. Once the vehicle speed has been determined for a particular geographical position, a database can be consulted to determine the speed limit associated with that position along the route, thereby enabling a determination to be made as to whether the driver has exceeded the speed limit. In a block 60, the plurality of metrics calculated from the GPS data are used to determine the driver's performance ranking, generally as described above in connection with FIGS. 1 and 2.

It should be recognized that the GPS data can be used to calculate fewer metrics than those described above in connection with FIG. 7, and that the metrics specifically identified in FIG. 7 are intended to be exemplary, rather than limiting. Furthermore, if the vehicle includes other sensors for determining metrics, the sensor data can also be forwarded to the remote computing device to be used in calculating the driver's performance ranking, also generally as described above. Furthermore, it should be recognized that rather than (or in addition to) transmitting the GPS data to a remote computing device, the GPS data can be conveyed to a computing device on the vehicle, for determining the driver's performance ranking.

Preferably, performance rankings are determined for each driver in a company (or each driver of a vehicle for which driver performance is of interest), and posted publicly so that drivers can compare each other's individual performance rankings. The public display of driver performance is expected to provide an incentive for drivers to improve their driving performance rankings.

Calculation of an Exemplary Performance Ranking

The calculation of an exemplary performance ranking is described below in regard to one exemplary embodiment. It should be recognized that this approach for determining the performance ranking is not intended to be limiting, but rather to be illustrative of one contemplated valuation scheme and performance ranking implementation. In the exemplary performance ranking, a relatively higher numerical ranking value is generally indicative of relatively poorer driver performance. Thus, in this example, the lower the numerical performance ranking, the better the driver's performance.

In this example, the sensor data are collected for various metrics corresponding to vehicle acceleration, vehicle deceleration, vehicle idle time, and vehicle speed. Each minute of acceleration time will be assigned one point. Each minute of deceleration time will be assigned one point. Each minute of idle time will be assigned one point. In this example, the fleet operator is also particularly concerned with drivers who violate speed limits on the freeway. Thus, each minute where the vehicle speed exceeds 60 miles an hour while the driver is driving the vehicle on the freeway will result in five points (the fleet operator weighting excessive vehicle speed five times greater than the other metrics). The points are added together to achieve a combined total. The total is then normalized to derive a numerical ranking value for the driver. As noted above, the normalization can be based on either distance driven or time of operation, or a combination thereof.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method of producing a numerical ranking indicative of a performance of a driver based on a plurality of metrics corresponding to the driver's operation of the vehicle, comprising the steps of:

(a) while the driver is operating the vehicle, automatically collecting data used to calculate the plurality of metrics, each of the plurality of metrics corresponding to the performance of the driver while operating the vehicle, the plurality of metrics including at least an idle time metric and a route deviation metric, where the route deviation metric is based on determining if the driver has deviated from a predefined route while operating the vehicle;

(b) for each of the plurality of metrics, automatically determining a numerical value for the metric;

(c) automatically combining the numerical values for the plurality of metrics to achieve a numerical performance value;

(d) automatically normalizing the numerical performance value to achieve the numerical ranking indicative of the performance of the driver; and (e) displaying the numerical ranking in real-time to the driver while the driver is operating the vehicle.

2. The method of claim 1, wherein the step of normalizing the numerical performance value comprises the step of normalizing the numerical performance value based on a length of time the driver has operated the vehicle while the plurality of metrics are being collected.

3. The method of claim 1, wherein the step of normalizing the numerical performance value comprises the step of normalizing the numerical performance value based on a distance over which the driver has operated the vehicle while the plurality of metrics are being collected.

4. The method of claim 1, wherein determining if the driver has deviated from the predefined route comprises the steps of:

(a) providing predefined route data comprising geographical coordinates for a route that the driver is to follow while driving the vehicle;

(b) automatically collecting geographical coordinate data indicative of a location of the vehicle, while the driver is operating the vehicle; and (c) determining if the driver has deviated from the predefined route by comparing the collected geographical coordinate data with the predefined route data.

5. The method of claim 1, wherein the plurality of metrics further comprise a speed metric that indicates if the driver has exceeded the speed limit, the speed limit metric being determined by performing the steps of:

(a) providing a baseline speed limit value for a type of road driven by the driver with the vehicle;

(b) automatically collecting vehicle speed data while the driver is operating the vehicle on the type of road; and (c) determining if the driver has deviated from the baseline speed limit value by comparing the collected vehicle speed data with the baseline speed limit value.

6. The method of claim 1, wherein the plurality of metrics further comprise a speed metric that indicates if the driver has exceeded the speed limit, the speed metric being determined by performing the steps of:

(a) providing predefined route data comprising geographical coordinates and speed limits associated with each geographical coordinate for a route driven by the driver while driving the vehicle;

(b) automatically collecting geographical coordinate data and vehicle speed data while the driver is operating the vehicle; and (c) determining if the driver has violated the speed limit by comparing the collected geographical coordinate data and vehicle speed data collected with the predefined route data and the speed limits associated with the geographical coordinates of the route.

7. The method of claim 1, wherein the steps of automatically determining a numerical value for each metric collected, automatically combining the numerical values for each metric to achieve the numerical performance value, and automatically normalizing the numerical performance value to achieve the numerical ranking of the driver's performance are executed by a computing device that is at the vehicle.

8. The method of claim 1, further comprising the step of conveying the plurality of metrics to a remote computing device for execution of the steps of automatically assigning the numerical value for each metric collected, automatically combining the numerical values for each metric to achieve the numerical performance value, and automatically normalizing the numerical performance value to achieve the numerical ranking of the driver's performance.

9. The method of claim 8, wherein the step of conveying the plurality of metrics to the remote computing device comprises the step of wirelessly transmitting the plurality of metrics to the remote computing device in real-time.

10. The method of claim 8, wherein the step of conveying the plurality of metrics to the remote computing device comprises the step of conveying the plurality of metrics to the remote computing device after the driver has parked the vehicle.

11. The method of claim 1, wherein the step of automatically determining a numerical value for the plurality of metrics comprises the step of determining if a weighting factor is to be applied to any of the plurality of metrics, and if so, applying the weighting factor to the metric before combining the numerical values to achieve the numerical performance value.

12. The method of claim 1, wherein the step of automatically collecting the data that can be used to calculate the plurality of metrics comprises the steps of:

(a) automatically collecting a plurality of positional data points, each positional data point comprising a geographical position of the vehicle at a specific point in time; and (b) using the plurality of positional data points to automatically calculate the plurality of metrics.

13. The method of claim 12, wherein the step of automatically collecting the plurality of positional data points comprises the step of automatically collecting the plurality of positional data points whenever an ignition switch in the vehicle is on.

14. The method of claim 13, wherein the step of using the plurality of positional data points to calculate the plurality of metrics comprises using the plurality of positional data points to automatically calculate an idle time metric.

15. A memory medium having machine instructions stored thereon for carrying out the following steps:

(a) while a driver is operating a vehicle, automatically collecting data corresponding to the performance of the driver, the data including at least an idle time metric and a route deviation metric, where the route deviation metric is based on determining if the driver has deviated from a predefined route while operating the vehicle;

(b) for each metric, automatically determining a numerical value for the metric;

(c) automatically combining the numerical values for each metric to achieve a numerical performance value;

(d) automatically normalizing the numerical performance value to achieve the numerical ranking indicative of the performance of the driver; and (e) displaying the numerical ranking in real-time to the driver while the driver is operating the vehicle.

16. A system for producing a numerical ranking indicative of a performance of a driver based on a plurality of metrics corresponding to an operation of a vehicle by a driver, comprising:

(a) a memory in which a plurality of machine instructions are stored;
(b) a data link for importing at least one of the plurality of metrics determined while the driver is operating the vehicle, and data collected while the driver is operating the vehicle, where such data are to be used to calculate the plurality of metrics, wherein the plurality of metrics include an idle time metric and a route deviation metric, where the route deviation metric is based on determining if the driver has deviated from a predefined route while operating the vehicle; and
(c) a processor, coupled to the memory and to the data link, said processor executing the machine instructions to carry out a plurality of functions, including:
  (i) where the data link imports data that are to be used to calculate the plurality of metrics, automatically calculating the plurality of metrics from the data;
  (ii) for each metric that is calculated or imported, automatically determining a numerical value for the metric;
  (iii) automatically combining the numerical values for the plurality of metrics to determine a numerical performance value; (iv) normalizing the numerical performance value to determine the numerical ranking indicative of the performance of the driver; and (v) displaying the numerical ranking in real-time to the driver while the driver is operating the vehicle.

17. A method of using a plurality of positional data points to produce a numerical ranking indicative of a performance of a driver, each positional data point comprising a geographical position of the vehicle at a specific point in time, comprising the steps of:

(a) automatically collecting the plurality of positional data points while the driver is operating the vehicle;
(b) using the plurality of positional data points to automatically calculate a plurality of metrics, each of the plurality of metrics corresponding to the performance of the driver while operating the vehicle, where the calculations are performed at the vehicle and the plurality of metrics include at least an idle time metric and a route deviation metric, where the route deviation metric is based on determining if the driver has deviated from a predefined route while operating the vehicle;
(c) for each metric calculated, automatically determining a numerical value for the metric, where the determinations of the numerical value for each metric are performed at the vehicle;
(d) automatically combining the numerical values for the plurality of metrics to determine a numerical performance value, where the determination of the numerical performance value is performed at the vehicle;
(e) automatically normalizing the numerical performance value to achieve the numerical ranking indicative of the performance of the driver, where the determination of the numerical ranking is performed at the vehicle; and
(f) displaying the numerical ranking to the driver in real-time while the driver is operating the vehicle.

18. The method of claim 17, wherein the step of automatically collecting the plurality of positional data points comprises the step of automatically collecting the plurality of positional data points whenever an ignition switch in the vehicle is turned on.

* * * * *